May 26, 1931. R. H. BROWN 1,807,234
BABY HAMMOCK FOR AUTOMOBILES
Original Filed Dec. 6, 1924 2 Sheets-Sheet 1

Witness:
Richard J. Jacker

Inventor:
Reinhardt H. Brown
by John Howard McElroy
his Atty.

May 26, 1931. R. H. BROWN 1,807,234
BABY HAMMOCK FOR AUTOMOBILES
Original Filed Dec. 6, 1924 2 Sheets-Sheet 2
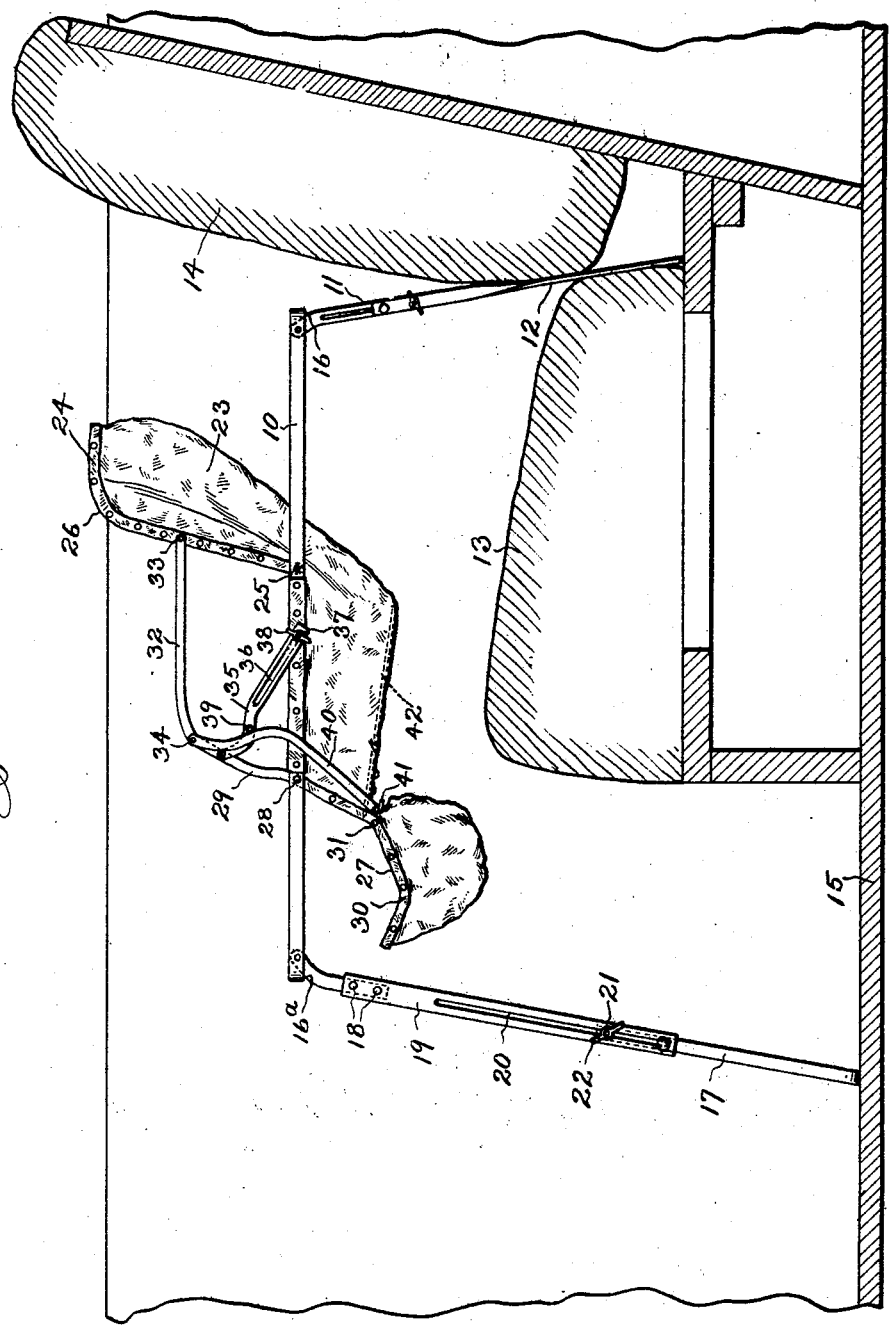

Patented May 26, 1931

1,807,234

UNITED STATES PATENT OFFICE

REINHARDT H. BROWN, OF LA PORTE, INDIANA

BABY HAMMOCK FOR AUTOMOBILES

Application filed December 6, 1924, Serial No. 754,256. Renewed July 12, 1928.

My invention is concerned with baby hammocks adapted primarily for use in automobiles, and is designed to produce a device of the class described that can be used either (1) as a plain hammock, or (2) as a seat with a back and a foot well, or (3) which can be folded up and stored away in a small space.

To this end, it consists of a certain novel construction, as will be hereinafter fully described, and particularly pointed out in the claims.

To illustrate my invention, I annex hereto two sheets of drawings in which the same reference characters are used to designate identical parts in all the figures of which Figure 1 is a view showing my invention in place in a small automobile, and with it adjusted for use as a plain hammock;

Fig. 4 is a side elevation on an intermediate scale showing the apparatus as adjusted for a seat with a back and a foot well.

Figure 1:
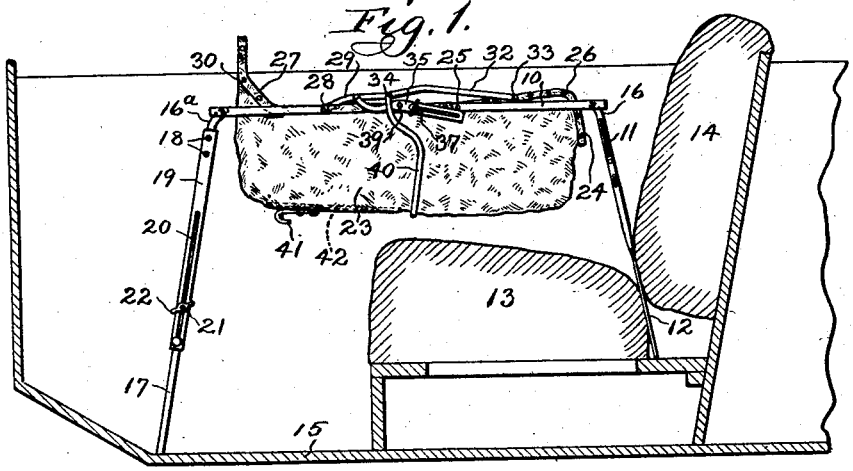

In carrying out my invention, I preferably employ as a basis of the apparatus a rectangular main frame 10, which preferably consists of a flat bar of steel bent into the rectangular shape shown with the thin section of the bar vertical and with the ends of the bar connected, preferably at the center of one end of the frame. Some means must be provided for supporting the hammock, and for its preferred use in small automobiles, when it is carried by the automobile instead of upon its own wheels, I preferably provide substantially the construction shown in the companion application No. 701,012 filed March 22, 1924, now eventuated into Patent No. 1,580,404. In the present case, I pivot to the rear of the main frame 10 a U-shaped rear supporting frame 11, which preferably consists of a simple flat bar, preferably having the twist therein on the two sides at 12, so that the bottom portion in effect will be narrower so that it can more readily be thrust in between the seat cushion 13 and the back cushion 14 of the automobile 15 in which it is supposed to be mounted. The pivoted ends of the frame 11 have the contacting surface at 16 adapted to engage the under side of that end of the main frame 10 so as to limit the angle that the rear frame 11 can assume relative to the main frame 10. The front supporting frame 17 is preferably U-shaped, and is provided with the same contacting surface 16a for the same purpose, but is preferably made adjustable as to its length so that the apparatus can be employed in connection with automobiles in which the distance from the top of the seat frame to the floor varies, as will be readily understood. For this purpose, I preferably secure by the rivets 18 on the short upper end pieces of the frame 17 the shallow U-shaped telescoping pieces 19, which have an elongated slot 20 therein through which passes the bodies 21 of the locking studs secured to the telescoping lower portion of the frame 17 and secured in place whenever it is adjusted by the wing nuts 22. With the construction shown, it will be obvious that the main frame 10 can be supported in an automobile of any desired distance from the seat frame to the floor, and it will further be obvious that it may be adjusted so that both of the frame legs 11 and 17 are of the same length, so that the apparatus can be used for a plain hammock or bassinet in a room, or elsewhere.

Coming now to the per se novel portion of my invention, I employ a roomy body portion 23, which is preferably formed of a strong canvas cloth or some similar material so shaped as to accommodate itself to the positions hereinafter described, and preferably having a fullness so that when the apparatus is adjusted for a plain hammock, as shown in Fig. 1, it will take the generally troughlike shape shown in side elevation in said figure. The flexible material going to make up the body portion 23 is preferably secured at the center of its sides by being folded over the center portion of the sides of the frame 10 and secured thereto by rivets passed through said frame and through the overlapping portions of the cloth.

At what I may call the back frame end, the flexible body portion 23 is folded over the generally U-shaped frame 24 and riveted thereto so that the frame 24, which preferably consists of a flat steel bar formed into the shape shown, is covered by the cloth except at its ends where it is fulcrumed at 25 to the main frame. While the frame 24 has the general U-shape shown, it has the curve at 26 in the sides thereof, as seen, in order to produce the troughlike effect in this portion of the frame which constitutes the back of the seat when the parts are adjusted as shown in Fig. 4. Similarly, the foot well end of the body portion 23 has its edges folded around and riveted to the lower portion of the forward frame 27, which has the general U-shape, and is like the frame 24 formed of flat metal and is fulcrumed to the main frame at 28. Unlike the frame 24, a portion 29 thereof extends beyond the fulcrum 28, and is pivoted to other elements as hereinafter described. In addition, it has therein the two bends at 30 and 31. These bends serve to produce the foot well effect shown in Fig. 4 when the frame is adjusted as shown in said figure.

The frames 24 and 27 are connected by the arm rest pieces 32, pivoted to the frame 24 at 33 and to the ends of the frame 27 at 34. Also pivoted to the portion 29 of the frame 27 are the lock bars 35, which are provided with the elongated slots 36 in their free end through which slots pass the threaded bolts 37 secured to the frame 10 with which cooperate the lock wing nuts 38, so that the parts can be locked in either of the positions shown in Figs. 1, 2 or 4. These bars 35 also have the lugs 39 thereon which cooperate in the position shown in Fig. 4 with the frame 40, which is pivoted to the frame 27 and to the arm rest bars 32 at 34. This frame 40 is U-shaped and likewise made of a flat steel bar, and its end portion cooperates in the position shown in Fig. 4 with a pair of hooks 41 secured on the under side of the flexible body portion 23 which has been raised so as to hold up in said position the portion of the body portion which constitutes the seat. It will be noted that as the back rest is raised and the foot well lowered from the position shown in Fig. 1, the pins 39 engage the frame 40 and move it to the position shown in Fig. 3, where it has engaged the hooks 41 and elevated the forward portion of the seat. I prefer to give some rigidity to said seat by securing thereto a generally rectangular board seat portion 42, the position of which is shown in dotted lines in Fig. 4 and in Fig. 3.

Figure 2:
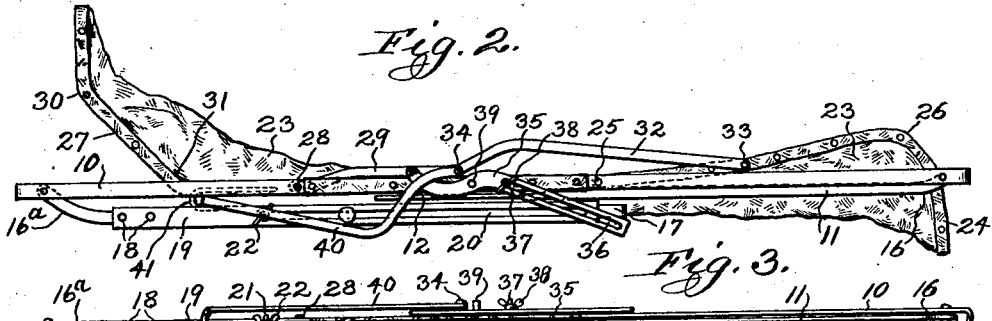
Fig. 2 is a view in side elevation on a much larger scale showing it folded up ready for carrying or storage.
Figure 3:
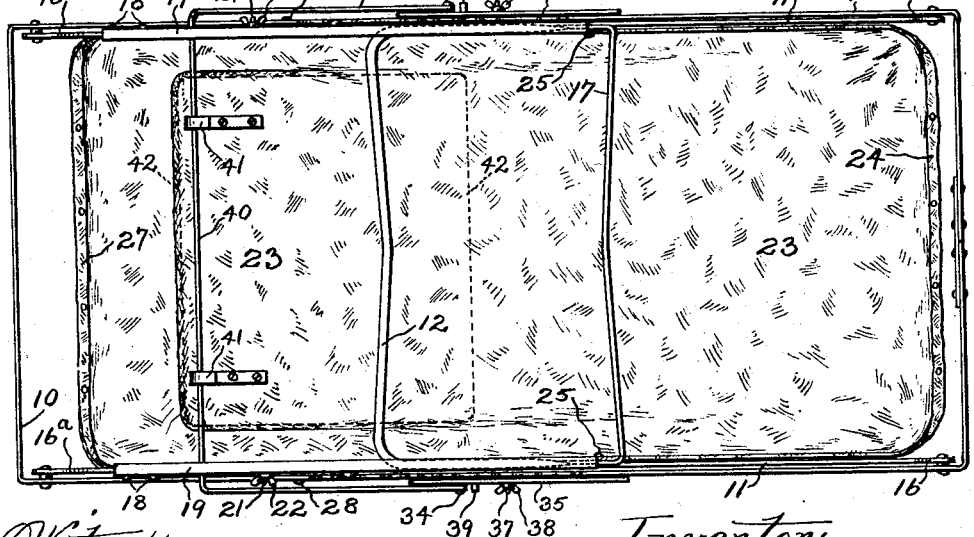
Fig. 3 is a top plan view of the apparatus as seen in Fig. 2.

With the parts of the frame and connections constructed as shown, the device can readily be made to assume either of the positions shown in Figs. 1 or 4, for use, or it can be folded up as shown in Figs. 2 and 3 for storage or transportation. When it is so folded up, it will be noted that the frame 40 has been engaged by the portions 19 of the supporting frame 17 and swung up still further from the position shown in Fig. 4, so that it assists in flattening out or collapsing the adjacent portion of the body 23. It will also be noted that in the collapsed position of the parts shown in Figs. 2 and 3, the bottoms of the frames 12 and 17 engage the body 23 and collapse it between themselves and the main frame 10.

While I have shown and described my invention as embodied in the form which I at present consider best adapted to carry out its purposes, it will be understood that it is capable of modifications and that I do not desire to be limited in the interpretation of the following claims except as may be necessitated by the state of the prior art.

What I claim as new and desire to secure by Letters Patent of the United States is:

1. In a device of the class described, the combination with a main frame and means of supporting the same, of a generally troughlike flexible body portion attached at the center of two of its sides to said frame, a pair of supplemental frames pivoted to the main frame towards the ends thereof and having the ends of said body portion attached thereto, connections extending from one supplemental frame to the other and connected to the central portion of the main frame which can be adjusted so that said body portion may assume either a continuous trough-like shape or that of a seat with a back and foot well, said connections including a movable generally U-shaped frame that in the first position permits said trough-like shape and in the second supports the forward end of the seat portion and means to hold said connections in either adjustment.

2. In a device of the class described, the combination of a main frame and means for supporting the same, of a generally troughlike flexible body portion attached at the center of two of its sides to said frame, a pair of supplemental frames pivoted to the main frame towards the ends thereof and having the ends of said body portion attached thereto, a single member on each side connecting the supplemental frames which can be adjusted so that said body portion may assume either a continuous trough-like shape or that of a seat with a back and foot well, and means for securing said supplemental frames and connecting members in either position, said means consisting of a pair of slotted links pivotally connected to one of said supplemental frames, and set screws connected to the main frame cooperating with said slots.

3. In a device of the class described, the combination with a main frame and means of supporting the same, of a generally troughlike flexible body portion attached at the center of two of its sides to said frame, a pair of supplemental frames pivoted to the main frame towards the ends thereof and having the ends of said body portion attached thereto, connections between said supplemental frames which can be adjusted so that said body portion may assume either a continuous trough-like shape or that of a seat with a back and foot well, said connections including a generally U-shaped movable frame that in its first position permits said trough like shape and in the second supports the forward end of the seat portion and means for securing said connections in either position, said means consisting of a pair of slotted links pivotally connected to one of said supplemental frames, and set-screws connected to the main frame co-operating with said slots, said slotted links carrying abutments which co-operate with the U-shaped frame to hold it in the foot well engaging position.

4. In a device of the class described, the combination with a main frame and means of supporting the same, of a generally trough-like flexible body portion attached at the center of two of its sides to said frame, a pair of supplemental frames pivoted to the main frame towards the ends thereof and having the ends of said body portion attached thereto, connections between said supplemental frames which can be adjusted so that said body portion may assume either a continuous trough-like shape or that of a seat with a back and foot well, said connections including a generally U-shaped frame that in the first position permits said trough-like shape and in the second supports the forward end of the seat portion, and hook members on the under side of the body portion to be engaged by the U-shaped frame in the foot well and seat position.

5. The combination with a main frame and means of supporting the same, of a generally trough-like flexible body portion attached at the center of two of its sides to said frame, a pair of supplemental frames pivoted to the main frame towards the ends thereof and having the ends of said body portion attached thereto, and connections between said supplemental frames which can be adjusted so that said body portion may assume either a continuous trough-like shape or that of a seat with a back and foot well, said connections including a generally U-shaped frame that in the first position permits said trough-like shape and in the second supports the forward end of the seat portion, the end of the rear frame being turned down and the end of the forward frame being turned up.

6. In a child's conveyance, the combination with a flexible body normally trough-shaped but adapted to assume a position in which the rear portion acts as a back rest and the front portion acts as a foot well and the forward part of the central portion is elevated and supported above its trough-shaped level to form a seat for a child seated therein, of a frame portion, horizontal in use, and having the sides of the central portion of the flexible body connected thereto, a U-shaped foot-well frame pivoted at its rear open end to the horizontal frame portion and having the adjacent end of the flexible body connected to its transverse portion, a U-shaped back-rest frame pivoted toward its open end to the horizontal frame portion and having the adjacent end of the flexible body connected to its transverse portion, and connections between said U-shaped frames so that when one is moved the other is moved therewith simultaneously to change the flexible body from one position to the other, said connections including means to elevate positively the forward part of the central portion of the flexible body to form a seat.

7. In a child's conveyance, the combination with a flexible body normally trough-shaped but adapted to assume a position in which the rear portion acts as a back rest and the front portion acts as a foot well for a child seated therein, of a frame portion, horizontal in use, and having the sides of the central portion of the flexible body connected thereto, a U-shaped foot-well frame pivoted at its rear open end to the horizontal frame portion and having the adjacent end of the flexible body connected to its transverse portion, a U-shaped back-rest frame pivoted toward its open end to the horizontal frame portion and having the adjacent end of the flexible body connected to its transverse portion, and connections between said U-shaped frames so that when one is moved the other is moved therewith simultaneously to change the flexible body from one position to the other, said flexible body having a generally rectangular rigid stiffening member therein to keep the seat portion in shape when adjusted to the sitting position, said connections including a member which supports the forward end of the stiffening member to hold it in a substantially horizontal position.

8. In a child's conveyance, the combination with a flexible body normally trough-shaped but adapted to assume a position in which the rear portion acts as a back rest and the front portion acts as a foot well for a child seated therein, of a frame portion, horizontal in use, and having the sides of the central portion of the flexible body directly connected thereto, a U-shaped foot-well frame pivoted at its rear open end directly to the horizontal frame portion and having the adjacent end of the flexible body connected to its transverse portion, a U-shaped back-rest frame pivoted toward its open end directly to the horizontal frame portion and having the adjacent end of the flexible body connected to its transverse portion, and connections between said back-rest frame and the central portion of the flexible body so that as the back-rest frame is raised, said central portion will also be raised to form a seat that is elevated toward the horizontal frame portion.

9. In a child's conveyance, the combination with a horizontal frame portion, of a foot-well frame, a back-rest frame, a flexible body receptacle connecting said foot-well and back-rest frames and adapted to have its bottom horizontal to form a hammock, or to have its front portion lowered with the foot-well frame and its rear portion raised with the back-rest frame, and connections between said back-rest frame and the central portion of said flexible body receptacle so that as the back-rest frame is raised said central portion will also be raised to form a seat that is elevated toward the horizontal frame portion.

10. In a child's conveyance, the combination with a horizontal frame portion, of a foot-well frame fulcrumed thereto, a back-rest frame fulcrumed to the horizontal frame portion, a flexible body receptacle connecting said foot-well and back-rest frames and adapted to have its bottom horizontal to form a hammock or to have its front portion lowered with the foot-well frame and its rear portion raised with the back-rest frame, and connections between said back-rest frame and the central portion of said flexible body receptacle so that as the back-rest frame is raised said central portion will also be raised to form a seat that is elevated toward the horizontal frame portion.

In witness whereof, I have hereunto set my hand this 4th day of December, 1924.

REINHARDT H. BROWN.